(12) United States Patent
Li et al.

(10) Patent No.: US 8,326,954 B2
(45) Date of Patent: Dec. 4, 2012

(54) SYSTEM AND METHOD FOR SYNCHRONIZING CONFIGURATIONS IN A CONTROLLER NETWORK

(75) Inventors: Wei Li, Peoria, IL (US); Dennis Lee Schumacher, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 569 days.

(21) Appl. No.: 12/219,463

(22) Filed: Jul. 23, 2008

(65) Prior Publication Data
US 2010/0023605 A1    Jan. 28, 2010

(51) Int. Cl.
*G06F 15/177* (2006.01)
(52) U.S. Cl. ......................... 709/221; 709/220
(58) Field of Classification Search .................. 709/221, 709/220
See application file for complete search history.

(56) References Cited

U.S. PATENT DOCUMENTS

| | | | |
|---|---|---|---|
| 5,260,875 A | 11/1993 | Tofte et al. | |
| 5,757,640 A | 5/1998 | Monson | |
| 5,850,341 A | 12/1998 | Fournier et al. | |
| 5,890,086 A | 3/1999 | Wellman et al. | |
| 5,974,348 A | 10/1999 | Rocks | |
| 6,522,948 B1 | 2/2003 | Benneweis | |
| 6,665,601 B1 | 12/2003 | Nielsen | |
| 6,801,876 B2 | 10/2004 | Barney et al. | |
| 6,810,405 B1* | 10/2004 | LaRue et al. | 707/613 |
| 6,898,502 B2 | 5/2005 | Watanabe et al. | |
| 7,020,553 B2 | 3/2006 | Nakamura et al. | |
| 7,171,281 B2 | 1/2007 | Weber et al. | |
| 7,233,814 B2 | 6/2007 | Wissinger et al. | |
| 2003/0114966 A1* | 6/2003 | Ferguson et al. | 701/29 |
| 2003/0212768 A1* | 11/2003 | Sullivan | 709/220 |
| 2004/0203719 A1* | 10/2004 | Ross et al. | 455/423 |
| 2005/0004735 A1 | 1/2005 | Kelly et al. | |
| 2005/0235352 A1* | 10/2005 | Staats et al. | 726/14 |
| 2007/0016340 A1 | 1/2007 | Soudier et al. | |
| 2007/0019683 A1* | 1/2007 | Kryzyanowski | 370/503 |
| 2007/0142990 A1 | 6/2007 | Moughler et al. | |
| 2007/0143585 A1* | 6/2007 | Ring et al. | 713/1 |
| 2007/0198144 A1 | 8/2007 | Norris et al. | |

FOREIGN PATENT DOCUMENTS
WO    WO 2007/078384    7/2007

\* cited by examiner

*Primary Examiner* — Moustafa M Meky
*Assistant Examiner* — Hee Soo Kim
(74) *Attorney, Agent, or Firm* — Finnegan, Henderson, Farabow, Garrett & Dunner LLP

(57) ABSTRACT

A method is disclosed for synchronizing configuration data. The method may include providing a controller network that includes a plurality of control modules and each control module may have registration information stored thereon. The method may include detecting a registration information change associated with a control module and receiving current configuration data from the control module, if the registration information change is detected. The method may also include creating new configuration data for each control module in the controller network based on the received current configuration data, and synchronizing the configuration of each control module with the created new configuration data.

18 Claims, 6 Drawing Sheets

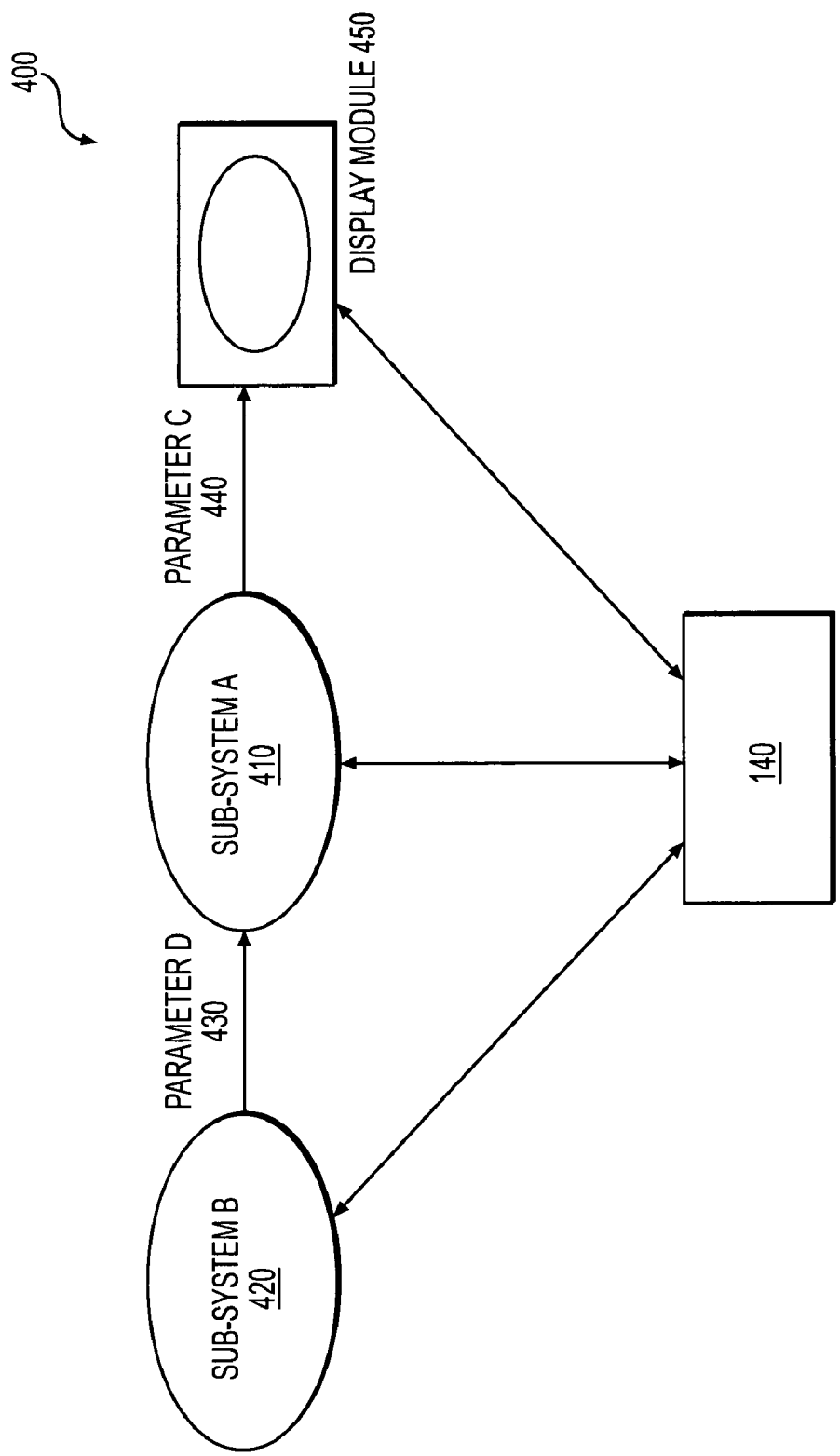

SYSTEM AND METHOD FOR SYNCHRONIZING CONFIGURATIONS IN A CONTROLLER NETWORK

TECHNICAL FIELD

This application relates to a system and method for configuring controllers, and more particularly, to a system and method for synchronizing configurations in a controller network.

BACKGROUND

Machines such as, for example, wheel loaders, motor graders, track-type tractors, dump trucks, and other types of machinery are used to perform a variety of tasks associated with an industry such as, mining, construction, manufacturing, transportation, or any other such industry. In order to perform these tasks, a machine may include a plurality of systems and each system may have one or more controllers, such as electronic control units (ECUs) or electronic control modules (ECMs). The ECMs may form a network and may be in communication with each other via one or more data links.

A particular function performed by the machine may usually involve several ECMs. Accordingly, a configuration change to one ECM may require a few corresponding changes to other ECMs in the machine. Therefore, synchronization of configuration files on all the ECMs may be needed in response to a configuration change to one of the ECMs. Such a configuration synchronization is typically performed manually by an operator of the machine. However, manually updating the configurations may be time-consuming and may require special skills and may introduce risks associated with human errors. In addition, conventional configuration updates usually result in a new release of one or more software programs, and the releasing process may cost significant money. Therefore, there is a need for automatic configuration synchronization, such that the configurations on all ECMs are synchronized automatically once a ECM specific configuration change occurs on one or more ECMs.

A method for automatically updating control programs in a hydraulic controller is described in U.S. Pat. No. 6,898,502 to Watanabe et al. ("the '502 patent"). The '502 patent describes a function changing system for construction machinery that includes a hydraulic excavator and a base station. A main controller of the system includes control programs and performs constant control functions to the hydraulic excavator. The control programs stored in the main controller can be modified to change the functions of the hydraulic excavator. In the '502 patent, a method determines if the control programs need to be upgraded, and if they do, the main controller will receive upgraded control programs sent from the base station and will rewrite the content of the control program station.

Although the technique described in the '502 patent may be effective for configuring a controller, it may be problematic. For example, the method described in the '502 patent uses a base station to upgrade the control programs in the main controller of the hydraulic excavator. Such a control program upgrade may affect other controllers involved in controlling the hydraulic excavator. However, the method does not automatically synchronize configurations of the other controllers. As a result, configurations of controllers involved in the same controlling task may be inconsistent, which may cause machine malfunctions. Furthermore, the control program updating described in the '502 patent is operated in a one-way mode from the base station side to the hydraulic excavator. Therefore, the method described in the '502 patent may be incapable of collecting status data from a plurality of controllers in a controller network and monitoring configuration changes made to any of these controllers.

The disclosed system and method for synchronization configurations in a controller network are directed towards overcoming one or more of the shortcomings set forth above.

SUMMARY

In one aspect, a method is disclosed for synchronizing configuration data. The method may include providing a controller network that includes a plurality of control modules and each control module may have registration information stored thereon. The method may include detecting a registration information change associated with a control module and receiving current configuration data from the control module, if the registration information change is detected. The method may also include creating new configuration data for each control module in the controller network based on the received current configuration data, and synchronizing the configuration of each control module with the created new configuration data.

In another aspect, a configuration synchronization system is disclosed for synchronizing configuration data in a controller network. The controller network may include a plurality of control modules with registration information stored thereon. The configuration synchronization system may include a processor. The processor may be configured to detect a registration information change associated with a control module. The processor may be further configured to receive current configuration data from the control module, if the registration information change is detected. The processor may be also configured to create new configuration data for each control module in the controller network based on the received current configuration data, and synchronize the configuration of each control module with the created new configuration data. The configuration synchronization system may further include a memory unit configured to store the current configuration data and the new configuration data.

BRIEF DESCRIPTION OF THE DRAWINGS

FIG. 4 illustrates an exemplary control system according to a disclosed embodiment.

DETAILED DESCRIPTION

Figure 1:
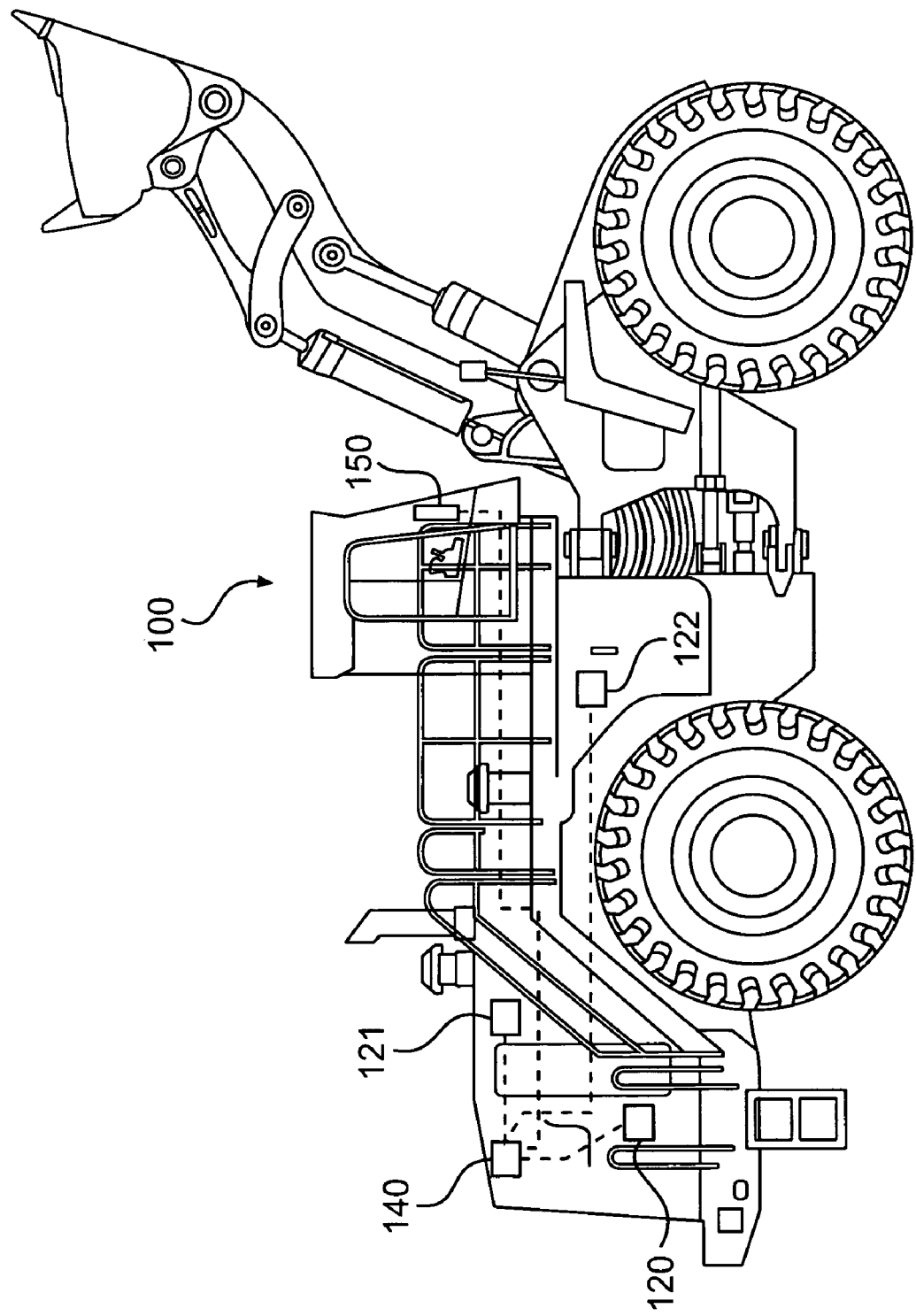
FIG. 1 illustrates an exemplary machine including a controller network and configuration synchronization system according to a disclosed embodiment.

FIG. 1 illustrates an exemplary machine 100 including a controller network and configuration synchronization system according to a disclosed embodiment. Machine, as the term is used herein, refers to a fixed or mobile machine that may perform some type of operation associated with a particular industry, such as mining, construction, farming, etc., that operates between or within work environments (e.g., a construction site, mine site, power plant, etc.) A non-limiting example of a fixed machine includes an engine system operating in a plant or off-shore environment (e.g., off-shore drilling platform). A non-limiting example of a mobile machine includes any commercial machine, such as a truck, crane, earth moving vehicle, mining vehicle, backhoe, material handling equipment, farming equipment, on-highway vehicle, or any other movable machine that operates in a work environment. Accordingly, although FIG. 1 illustrates machine 100 as a wheel loader, it is contemplated that machine 100 may include any type of machine.

Machine 100 may include one or more devices or systems that cooperate to control and/or monitor operations associated with machine 100. For instance, machine 100 may include, among other things, one or more control modules 120-122, a configuration synchronization system 140, and a display device 150. Although FIG. 1 illustrates control modules 120-122 and configuration synchronization system 140 as separate components, it is contemplated that configuration synchronization system 140 may be combined with one or more control modules 120-122 as a single unit. It is also contemplated that one of control modules 120-122 may act in the role of configuration synchronization system 140 in addition to performing its own controlling functions. Furthermore, machine 100 may include additional and/or different components than those listed above.

Control modules 120-122 may be each configured to monitor and/or control an operation associated with one or more components of machine 100. For example, control modules 120-122 may each receive data indicative of operational characteristics associated with a particular component collected by one or more monitoring devices during an operation of machine 100.

For example, control module 120 may be associated with an internal combustion engine associated with machine 100 to monitor and/or control an operation of the engine. In particular, control module 120 may be operable to monitor and/or control an exhaust pressure of the engine, a flow rate or temperature of fluid flowing through the cooling system of the engine, an air/fuel mixture supplied to a combustion chamber, a gas sensor of an exhaust system of the engine, or any other function of the internal combustion engine.

Additionally, control module 121 may be associated with a regeneration system associated with machine 100. For example, control module 121 may be operable to monitor and/or control a particulate sensor associated with a particulate trap, a regenerative element associated with a particular filter, an exhaust flow sensor associated with the exhaust system, or any other aspect associated with the regeneration system.

Similarly, control module 122 may be associated with a cooling system of machine 100 to monitor and/or control the operation and performance of the cooling system. For example, control module 122 may be operable to monitor and/or control a constant pressure valve for maintaining a coolant pressure, a displacement of a hydraulic pump, a temperature sensor for monitoring the temperature of a coolant, and a viscosity of a coolant flowing through the cooling system.

It is contemplated that control modules 120-122 may be any other ECUs or ECMs that perform particular controlling functions to one or more components of machine 100. Non-limiting examples of control modules 120-122 may include an engine common ECM, a front engine ECM, a rear engine ECM, an implementation ECM, a road analysis ECM, a chassis ECM, a transmission ECM, a brake ECM, and a display ECM. It is also contemplated that control modules 120-122 may be any other monitor devices that collect, analyze and display data.

Control modules 120-122 and configuration synchronization system 140 may be in communication with each other via any wired or wireless medium suitable for data transmission such as, for example, a data wire, an Ethernet connection, a fiber optic link, a microwave communication channel, Bluetooth, or any other type of medium for communicating information between configuration synchronization system 140 and control modules 120-122. It is contemplated that the controller network of machine 100 may include one or more sub-networks, relatively separate from each other. For example, the controller network may include a first sub-network connected via a CAN data link, and a second sub-network connected via an Ethernet. Control modules 120-122 may each be on one or more sub-networks. Consistent with the present disclosure, configuration synchronization system 140 may be on each sub-network.

In some embodiments, control modules 120-122 and configuration synchronization system 140 may communicate configuration data among each other, so that the configuration data are synchronized in machine 100. For instance, configuration synchronization system 140 may be configured to request configuration data from control modules 120-122. In response to the request, control modules 120-122 may each be configured to provide configuration synchronization system 140 with configuration data associated with the respective control module. Configuration synchronization system 140 may be further configured to perform a series of analysis and optimization operations on the configuration data. Once the configuration data are optimized, configuration synchronization system 140 may be configured to send the optimized configuration data back to control modules 120-122, so that the configuration data associated with control modules 120-122 are synchronized.

Configuration data, as the term is used herein, includes data indicative of a current configuration or status of a control module. Configuration data may include one or more parameters reflective of the setup, arrangement, functionality, operability, and interaction of the control module and components associated with the control module. For example, configuration data may include supporting parameters that configure the control module to respond to other control modules upon request. Configuration data may also include read requests that configure the control module to request support from other control modules, write requests that configure the control module to write one or more parameter values to other control modules, and a parameter group broadcast that configures the control module to request response of other control modules to its parameters. Configuration data may further include request frequency information that defines how often the control module needs to request or respond.

In some embodiments, configuration data may also describe the physical and operational parameters associated with the respective control module, such as the number of components associated with the control module, the type of each component, an ID number associated with one or more components, one or more operational characteristics of the components, interactions between components, etc. Furthermore, configuration data may also include port locations of components that may be coupled to the control module, software/firmware information associated with the control modules or any of its associated components, status information associated with each component, and/or data elements associated with each component.

Machine 100 may further include a display device 150 configured to display status messages during the configuration synchronization process performed by configuration synchronization system 140. Display device 150 may be, for example, a computer, an operator panel, or an LCD. In one embodiment, display device 150 may be an integral part of an operator console. Display device 150 may be coupled to configuration synchronization system 140 or any of control modules 120-122 via communication cables, wireless networks, or other communication mediums. Display device 150 may be configured to receive and display one or more messages that indicate the status of configuration synchronization. For instance, display device 150 may provide indication to the user that a configuration synchronization is needed. For another instance, display device 150 may show a message to indicate if the synchronization is successfully completed. In some embodiments, display device 150 may further include an audio unit and provide an audible indication when synchronization has failed.

Figure 2:
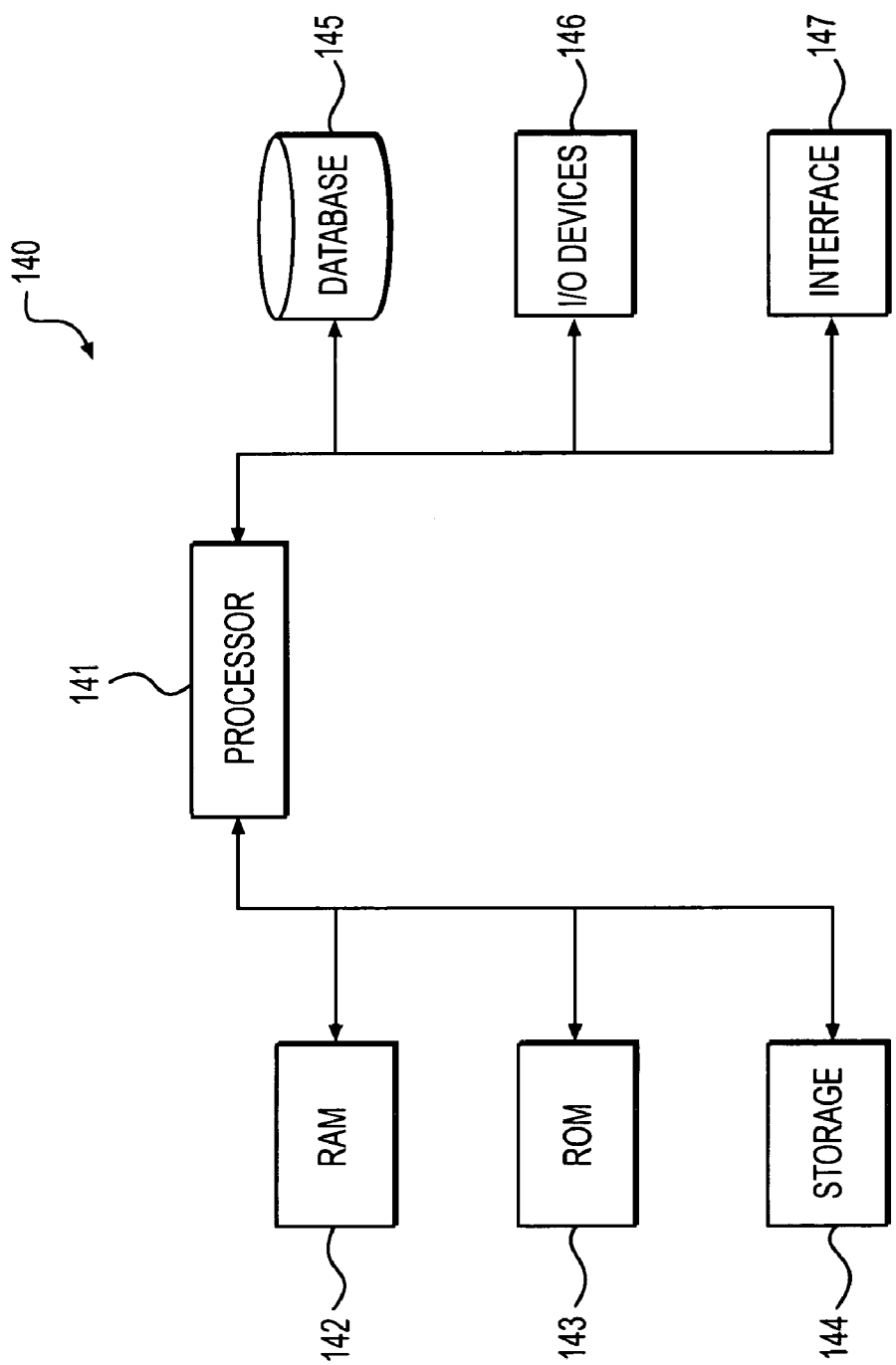
FIG. 2 illustrates an exemplary configuration synchronization system according to a disclosed embodiment.

FIG. 2 illustrates an exemplary configuration synchronization system 140 according to a disclosed embodiment. Configuration synchronization system 140 may include any means for collecting, analyzing, monitoring, storing, reporting, analyzing, optimizing, and/or communicating data. For example, configuration synchronization system 140 may include a central processing unit (CPU) 141, a random access memory (RAM) 142, a read only memory (ROM) 143, a storage 144, a database 145, I/O devices 146, an interface 147, etc. Configuration synchronization system 140 may be configured to execute and run software programs that collect, analyze, store, transmit, organize, and monitor various configuration data associated with machine 100.

CPU 141 may include one or more processors that can execute instructions and process data to perform one or more processes associated with configuration synchronization system 140. For instance, CPU 141 may execute software that enables configuration synchronization system 140 to request and/or receive configuration data from one or more control modules 120-122. CPU 141 may update the operational parameters associated with configuration synchronization system 140 based on the received configuration data and the determined machine type. CPU 141 may also execute software that collects and distributes operation data to one or more off-board systems based on the configuration data.

Consistent with one embodiment, RAM 142 may be a battery backup random access memory (BBRAM). Storage 144 may include a mass media device operable to store any type of information needed by CPU 141 to perform processes associated with configuration synchronization system 140. Storage 144 may include one or more magnetic or optical disk devices, such as hard drives, CD-ROMs, DVD-ROMs, USB flash drives or any other type of mass media device.

Database 145 may include a collection of data stored on one or more memory devices. Database 145 may include data used by configuration synchronization system 140 and/or CPU 141. For example, database 145 may include predetermined data associated with machine 100. Consistent with embodiments of the present disclosure, database 145 may also include ECM information associated with each control module associated with machine 100. For example, database 145 may contain identifying information and registration information corresponding to various control modules associated with machine 100.

Identifying information may include module ID numbers, or any other type of information formatted to identify one or more control modules associated with machine 100. Module ID, as the term is used herein, is a unique tag for an individual control module so that it can be distinguished from other control modules. Registration information of a control module may include, for example, a unique tag for the configuration file of the control module, most recent file update time stamp, and most recent synchronization time stamp. Module ID and registration information may be provided by the control module automatically or in response to a request from configuration synchronization system 140. In some embodiments, database 145 may also include information related to each component controlled by the control modules.

Database 145 may further include current configuration files, as well as synchronized new configuration files of control modules 120-122. In some embodiments, database 145 may include current configuration files and synchronized new configuration files under two separate file directories. For example, directory "/Configuration/Current" may be used to store the current running configurations of each control module, and directory "/Configuration/New" may be used to store the new configuration to be used on each control module. Once a synchronization is successfully performed, the files under directory "/Configuration/Current" may be replaced by files under directory "/Configuration/New."

Input/Output (I/O) devices 146 may include one or more devices operable to communicate with systems or networks external to machine 100 such as, for example, the Internet, one or more computer systems, a communication network, a PCS network, or any other suitable network. I/O devices 146 may include one or more communication devices, such as a network card, a wireless transceiver, or any other device for providing a communication interface between configuration synchronization system 140 and an external component.

Interface 147 may include hardware and/or software components that allow a user to access information stored in configuration synchronization system 140. For example, configuration synchronization system 140 may include a data access interface that includes a graphical user interface (GUI) that allows external users to access, configure, store, and/or download information to external systems, such as computers, PDAs, diagnostic tools, or any other type of external data device. Interface 147 may allow a user to enable or disable the configuration synchronization function associated with machine 100. Moreover, interface 147 may allow a user to access and/or modify information, such as configuration data associated with one or more control modules included in database 145.

It is contemplated that control modules 120-122 may include components similar to those included in configuration synchronization system 140, as illustrated in FIG. 2. For example, each of control modules 120-122 may include a CPU, a memory module, a storage, a database, I/O devices, and an interface, etc. The storage of each control module may store the configuration file associated with the control module. Each control module may be configured to execute and run software programs that control one or more components of machine 100.

In some embodiments, configuration synchronization system 140 may be enabled or disabled by an authorized user, such as an operator or a service engineer of machine 100, via a proper tool with security protection. For example, the user may enable configuration synchronization system 140 via interface 147. Configuration synchronization system 140 may perform synchronization to configuration files on control modules 120-122. Consistent with some embodiments, configuration synchronization may start in response to an event or periodically (in predetermined time increments, during a CPU clock pulse, etc.) Alternatively, configuration synchronization may be started when certain conditions are satisfied, such as when the key is on, engine is not running and the synchronization feature is enabled.

Configuration synchronization system 140 may be operatively coupled to each of control modules 120-122 and configured to communicate information with each control module. For example, configuration synchronization system 140 may be configured with one or more ports operable to transmit and receive information to and from control modules 120-122. Configuration synchronization system 140 may be configured to request registration information associated with one or more control modules 120-122. For instance, configuration synchronization system 140 may query each of control modules 120-122 and request them to provide the most recent configuration file update time stamp associated with these control modules. For example, configuration synchronization system 140 may transmit a request signal to control module 120 associated with the internal combustion engine.

Configuration synchronization system 140 may be further configured to compare the most recent configuration file update time stamp of each control module with the most recent synchronization time stamp. The most recent configuration file update time stamp may indicate the time that the configuration file is most recently updated in each of control modules 120-122. The most recent synchronization time stamp may indicate the time that the configuration files of control modules 120-122 are most recently synchronized by configuration synchronization system 140. When the two time stamps do not match with each other, configuration synchronization system 140 may determine that a configuration update has occurred on the control module since the most recent synchronization. Accordingly, a new synchronization of the configuration data among all the control modules is needed. In some embodiments, a log file may be created to keep a record of the synchronization, such as the start and finish time of the synchronization and result of the synchronization (i.e., successful or unsuccessful).

To perform a new synchronization, configuration synchronization system 140 may be configured to request configuration data associated with one or more control modules 120-122. Specifically, configuration synchronization system 140 may request current configuration data from those control modules that have recently updated their configuration files. Configuration synchronization system 140 may be operable to receive the configuration data in response to the request. In one embodiment, configuration synchronization system 140 may receive the configuration data automatically in response to the request provided to control modules 120-122. Alternatively and/or additionally, configuration synchronization system 140 may actively extract the configuration data from control modules 120-122. The obtained current configuration files may be stored in database 145. Consistent with embodiments of the present disclosure, copies of current configuration files may be maintained on configuration synchronization system 140, until a configuration synchronization is successfully performed.

Once the requested configuration files are received, configuration synchronization system 140 may be configured to start an optimization process. Configuration synchronization system 140 may analyze the relationships of all the configuration files obtained from the control modules. For example, read requests and write requests in the configuration files may be considered, and control modules that are required by these requests may be analyzed. Configuration synchronization system 140 may further determine if there are any conflicts among these requests. Configuration synchronization system 140 may also consider available resources to accommodate these requests. For example, available bandwidth of the data link may be determined by configuration synchronization system 140.

Configuration synchronization system 140 may be further configured to optimize the overall machine configurations based on the analysis of configuration files and available resources. During the optimization, certain performance factors associated with machine 100 may be maximized subject to the requests and resources. For example, machine configurations may be optimized to minimize the data link load. Machine configurations may also be optimized to maximize the communication efficiency among control modules 120-122. In some embodiments, configuration synchronization system 140 may also remove conflicts among requests contained in different configuration files.

Configuration synchronization system 140 may optimize individual configuration files for each of control modules 120-122, based on the optimized overall machine configurations. Optimized configuration file for each control module may be created and stored in database 145. Consistent with embodiments of the present disclosure, the optimized configuration files may not overwrite those current configuration files until a configuration synchronization is successfully performed.

Configuration synchronization system 140 may communicate with control modules 120-122 and send the optimized configuration files to each of the control modules. In some embodiments, configuration synchronization system 140 may receive confirmations from an individual control module that the configuration file has been updated. Upon receiving the confirmation, configuration synchronization system 140 may overwrite those current configuration files with the optimized configuration files.

Methods and systems consistent with certain disclosed embodiments may provide a universal configuration synchronization system 140 for a machine that automatically adapts to a particular type of machine based on the configuration of the machine components and/or control modules. In one embodiment, configuration synchronization system 140 may automatically configure itself based on the configuration of each control module associated with a particular machine 100. The configuration of configuration synchronization system 140 may dictate the collecting, optimizing and synchronizing requirements for configuration data received by configuration synchronization system 140. Thus, different types of machines may include different control modules that may require specific configuration synchronization. An exemplary configuration synchronization method associated with one embodiment is described below.

Figure 3:
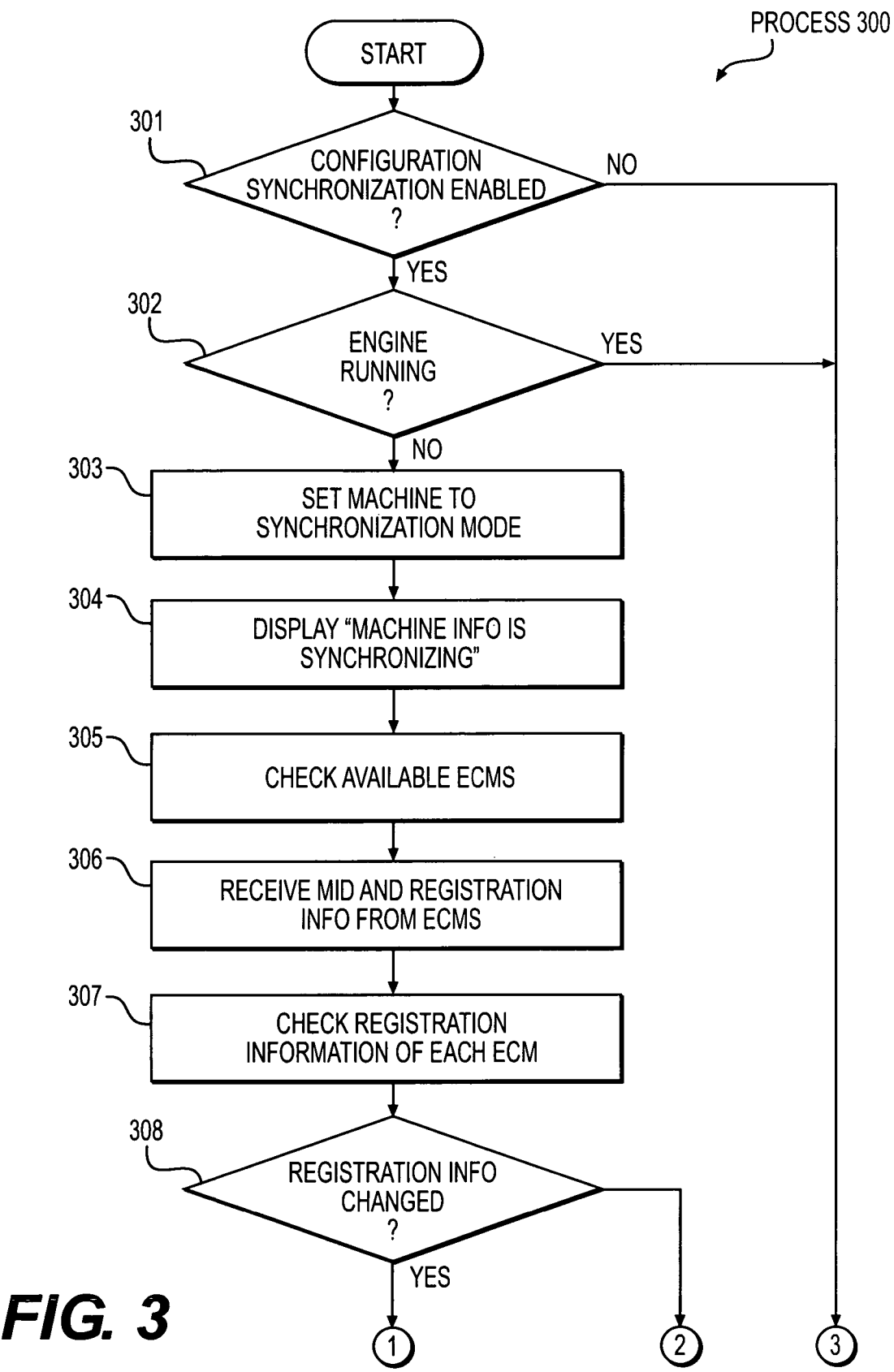
FIG. 3 illustrates a flowchart depicting an exemplary disclosed configuration synchronization process.
Figure 3:
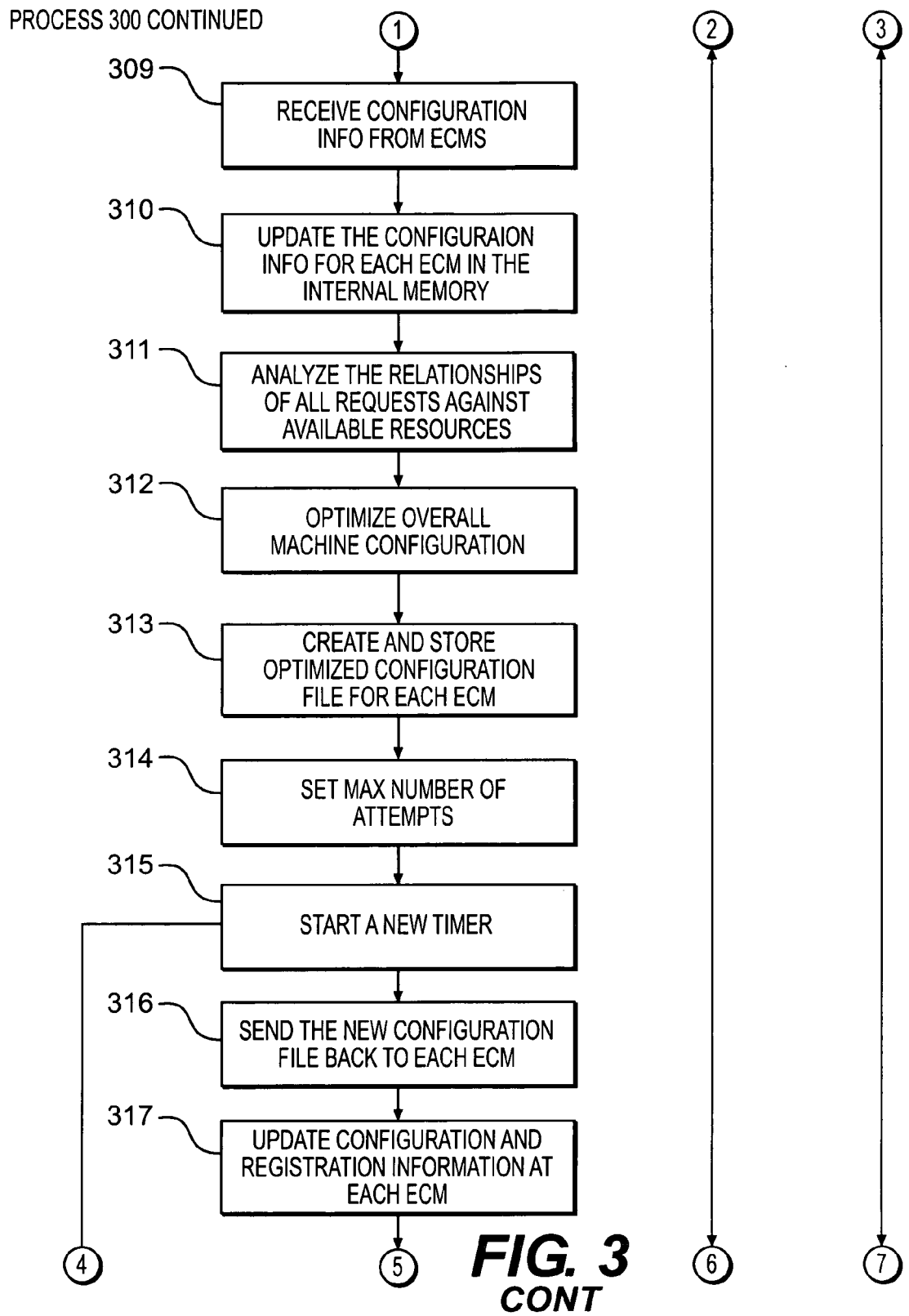
Figure 3:
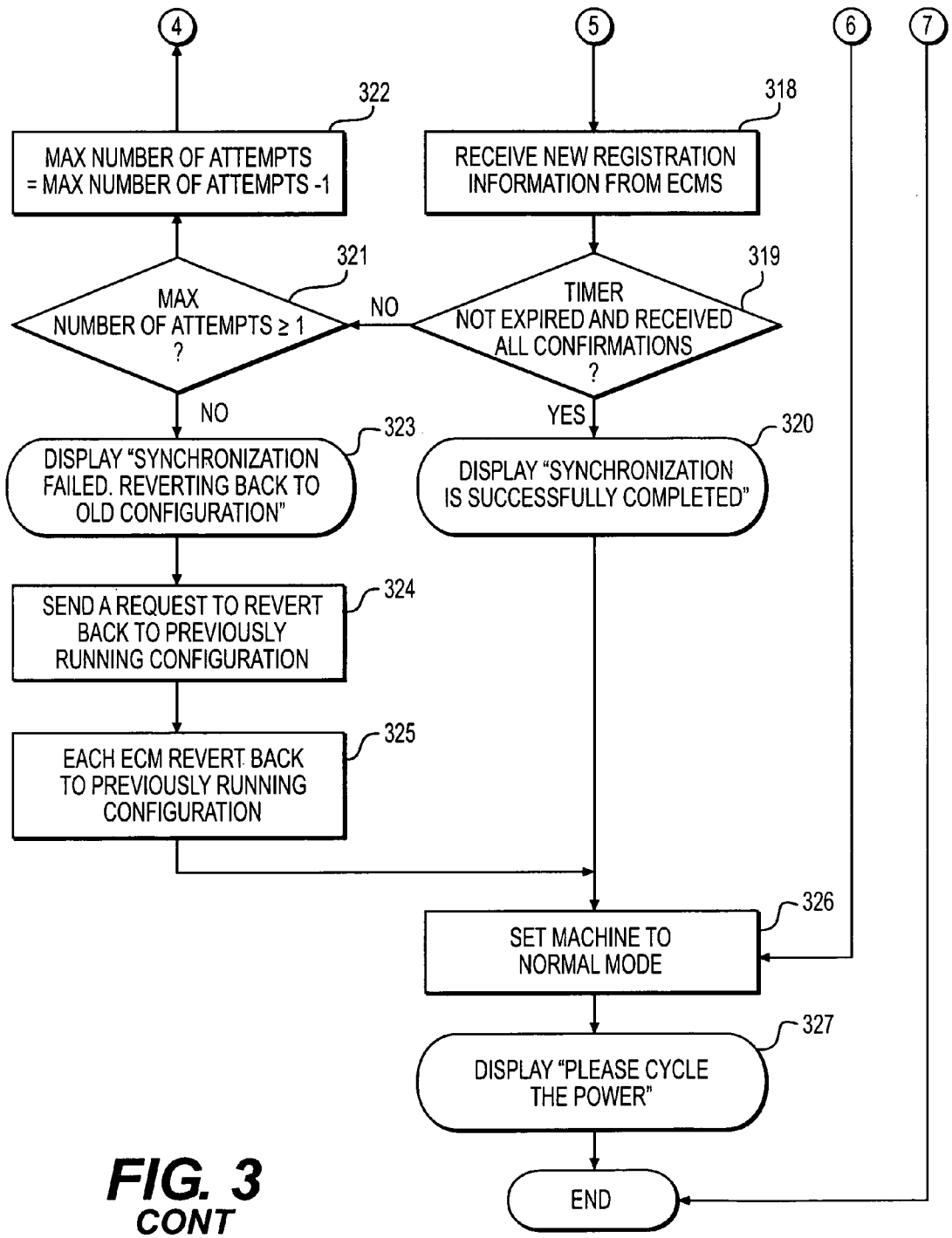

FIG. 3 illustrates a flowchart depicting an exemplary disclosed configuration synchronization process 300. Consistent with one embodiment, process 300 may start at key-on of machine 100. As shown in FIG. 3, it may be first determined if configuration synchronization system 140 is enabled (Step 301). For example, an authorized user may enable configuration synchronization system 140 via interface 147, and an enabled flag may be set upon the enablement. If configuration synchronization system 140 is disabled (Step 301: No), process 300 may terminate.

If configuration synchronization system 140 is enabled (Step 301: Yes), it may be further determined if certain conditions are satisfied. For example, it may be determined if engine of machine 100 is running (Step 302). If the engine is running (Step 302: Yes), process 300 may terminate. If the engine is not running (Step 302: No), configuration synchronization system 140 may set machine 100 to synchronization mode (Step 303). Consistent with the present disclosure, when the synchronization mode is set, the operation of configuration synchronization system 140 may not be disturbed or interrupted. Accordingly, display device 150 may be configured to display a message to indicate to the user that the synchronization mode is set (Step 304). For example, a message "machine information is being synchronized" may be displayed by the display device 150.

Configuration synchronization system 140 may check available control modules associated with machine 100 (Step 305). Different types of machines may include different control modules. In step 305, configuration synchronization system 140 may further set up communication with each available control module, such as control modules 120-122. Configuration synchronization system 140 may request and receive identifying information from each available control module (Step 306). The received identifying information may be stored in a memory/storage module. For example, configuration synchronization system 140 may request and receive module IDs of control modules 120-122 and store the module IDs in database 145. Along with the request for identifying information in step 306, configuration synchronization system 140 may also request and receive registration information from each available control module. For example, configuration synchronization system 140 may request and receive the most recent file update time stamp and the most recent synchronization time stamp from control modules 120-122 and store the stamps in database 145.

Upon receipt of the registration information, configuration synchronization system 140 may check the registration information (Step 307). For instance, configuration synchronization system 140 may determine if the registration information has changed (Step 308). Consistent with one embodiment, configuration synchronization system 140 may compare the most recent file update time stamp of each control module with the most recent synchronization time stamp. If the two stamps do not match, configuration synchronization system 140 may determine that the registration information for a particular control module has changed since the most recent synchronization.

If it is determined that the registration information has not been changed (Step 308: No), configuration synchronization system 140 may set the status of machine 100 to a normal operation mode (Step 326). No new synchronization may be performed since no configuration changes have occurred since the most recent synchronization. Display device 150 may be configured to display a message to request user input to start another power cycle for process 300 (Step 327). For example, display device 150 may display a message "please cycle the power." If it is determined that the registration information has been changed (Step 308: Yes), configuration synchronization system 140 may initiate a new synchronization.

In some embodiments, alternative or additional to steps 306-308 described above, individual control modules 120-122 may report to configuration synchronization system 140 if any configuration change has occurred on the respective local control module. For example, control modules 120-122 may each have a file directory "/Configuration/New" which may store new configuration files that contain the configuration changes. Existences of new configuration files under this directory may suggest that at least one configuration change has occurred on the respective control module, and this control module may report the configuration change to configuration synchronization system 140. Once a configuration change is reported, configuration synchronization system 140 may initiate a new synchronization.

Configuration synchronization system 140 may request and receive configuration information associated with one or more control modules 120-122 (Step 309). In some embodiments, configuration synchronization system 140 may request configuration information from all the available control modules determined in Step 305. Alternatively, configuration synchronization system 140 may request current configuration information from those control modules that have recently changed their registration information, and obtain configuration information of the other control modules from internal memories, such as from database 145. In some embodiments, upon receiving the request of configuration information, each control module may archive its current configuration file. For example, each control module may copy the currently running configuration file from its "/Configuration/Current" file directory to a "/Configuration/Archived" file directory.

Configuration synchronization system 140 may update the configuration information stored in the internal memory, such in database 145, with the obtained new configuration information (Step 310). In some embodiments, configuration information may be stored in database 145 in the form of a configuration file for each control module. Configuration synchronization system 140 may always maintain these current configuration files received from the individual control modules before the synchronization completes, in case the configuration synchronization fails. For example, these current configuration files may be maintained under a "/Configuration/Current" file directory.

Once the requested configuration information is received, configuration synchronization system 140 may analyze the relationships of all the configuration information obtained from the control modules against available resources on machine 100 (Step 311). For example, configuration synchronization system 140 may analyze control modules that are required by read requests and write requests in the configuration files. Configuration synchronization system 140 may further consider resources that are available to accommodate these requests. As an example, available communication bandwidth may be determined by configuration synchronization system 140. In some embodiments, configuration synchronization system 140 may also check the compatibility among requests contained in different configuration files.

Based on the analysis of configuration files and available resources, configuration synchronization system 140 may optimize the overall machine configurations (Step 312). For example, machine configurations may be optimized to minimize the data link load and/or maximize the communication efficiency among control modules 120-122. Configuration synchronization system 140 may further create a new configuration file for each of control modules 120-122, based on the optimized overall machine configurations (Step 313). Optimized configuration files may be stored in the internal memory of configuration synchronization system 140, such as database 145. Consistent with embodiments of the present disclosure, the optimized configuration files may be stored under a separate directory as those current configuration files. For example, the optimized configuration files may be maintained under a "/Configuration/New" file directory.

After the optimized configuration files are created and stored, configuration synchronization system 140 may start synchronizing control modules 120-122 with the optimized configuration files. Configuration synchronization system 140 may make several attempts to synchronize the configurations in case the first attempt does not succeed. In order to do that, configuration synchronization system 140 may set a max number of attempts (Step 314). In each attempt, a new timer may be started for the current attempt (Step 315). Configuration synchronization system 140 may communicate with control modules 120-122 and send the optimized configuration files to the individual control modules (Step 316). In some embodiments, configuration synchronization system 140 may send each configuration file stored under "/Configuration/New" file directory to the corresponding control module. In some other embodiments, configuration synchronization system 140 may compare the configuration file under "/Configuration/New" file directory with the one under "/Configuration/Current" directly that corresponds to the same control module. Configuration synchronization system 140 may only send those new configuration files that have changed compared to their corresponding current configuration files.

Each control module that receives a new configuration file may update its configuration information based on the received new configuration file (Step 317). For example, each control module may move the configuration file stored under "/Configuration/New" file directory into "/Configuration/Current" file directory. Each control module may further update its registration information in Step 317. For example, the most recent file update time stamp and the most recent synchronization time stamp of each control module may be updated. Configuration synchronization system 140 may receive the updated registration information from individual control modules (Step 318). In some embodiments, configuration synchronization system 140 may receive confirmations from individual control modules that the configuration information has been updated.

Configuration synchronization system 140 may continuously check if the timer has expired and all the confirmations have been received when the timer expires (Step 319). If all the confirmations have been received before the timer expires (Step 319: Yes), configuration synchronization system 140 may determine that the synchronization is successful. A message, such as "synchronization is successfully completed," may be displayed at display device 150 to indicate the completion of synchronization to the user (Step 320). Otherwise, if there is at least one confirmation yet to be received after the timer expires (Step 319: No), configuration synchronization system 140 may determine that the current attempt of synchronization has failed.

Configuration synchronization system 140 may determine if the maximum number of attempts still available for trying is larger than 1 (Step 321). If there is still at least one more attempt left (Step 321: Yes), configuration synchronization system 140 may reduce the maximum number of attempts by 1 (Step 322) and start a new time for the next attempt (Step 315). Steps 315-322 may be repeated until no more attempts are available (Step 321: No). Once maximum number of attempts is reduced to 0 (Step 321: No), configuration synchronization system 140 may determine that the synchronization has failed. A message, such as "synchronization failed," may be displayed at display device 150 to indicate the completion of synchronization to the user (Step 323). In step 323, display device 150 may further display a status message such as "reverting back to old configuration now . . . "

When the synchronization has failed, configuration synchronization system 140 may send a request to each control module to revert back to the previously running configurations (Step 324). In some embodiments, each control module may store its previously running configuration information under the "/Configuration/Archived" directory. To revert back to old configurations, each control module may clear the new configuration file and move the stored previously running configurations back to the "/Configuration/Current" directory (Step 325).

After either step 320 or step 325, configuration synchronization system 140 may set the status of machine 100 to a normal operation mode (Step 326). In some embodiments, the log file may be updated to record if the synchronization is successful. Display device 150 may be configured to display a message to request user input to start another cycle for process 300 (Step 327). For example, display device 150 may display a message "please cycle the power." Once the power is cycled, the configuration file stored under "/Configuration/Current" directory of each control module may come into effect.

INDUSTRIAL APPLICABILITY

Although the disclosed embodiments are described in association with a system for synchronizing machine configurations on several controller modules, the disclosed synchronization system may be used in any control system where it may be desirable to synchronize the configuration of its sub-systems. Specifically, the disclosed synchronization system may be configured to detect a registration information change associated with at least one sub-system. The processor may be further configured to receive current configuration data from the at least one sub-system, if the registration information change is detected. The processor may be also configured to create new configuration data for each control module in the control system, based on the received current configuration data, and synchronize the configuration of each sub-system with the created new configuration data.

For example, FIG. 4 illustrates an exemplary control system 400 according to a disclosed embodiment. Control system 400 may include, among other things, a sub-system A 410, a sub-system B 420, and a display module 450. A change may be made to sub-system A 410, such that sub-system A 410 may be configured to compute a new parameter C 440. In order to compute parameter C 440, sub-system A 410 may need a parameter D 430 from sub-system B. The calculated parameter C 440 may be displayed on display module 450. Therefore, a change to the configuration of sub-system A 410 may directly affect sub-system B 420 and display module 450, and may indirectly affect more sub-systems of control system 400.

Configuration synchronization system 140 as described in connection with FIG. 2 may be utilized to optimize the overall configuration data for control system 400 in response to the change of sub-system A 410. For example, configuration synchronization system 140 may first request registration information from sub-system A 410 and sub-system B 420. Since a change has been made to sub-system A 410, configuration synchronization system 140 may detect changes in the registration information associated with sub-system A 410. Accordingly, configuration synchronization system 140 may initiate a configuration synchronization for control system 400.

Configuration synchronization system 140 may request and receive current configuration data from each sub-systems in control system 400, such as sub-system A 410 and sub-system B 420. Configuration synchronization system 140 may then analyze current configuration data. For example, configuration synchronization system 140 may determine that a write request is needed to request sub-system B 420 to write parameter D 430 to sub-system A 410. Configuration synchronization system 140 may further determine that a pseudo communication channel is needed to send calculated parameter C 440 from sub-system A 410 to display module 450.

Configuration synchronization system 140 may optimize the overall configuration data subject to available resource in control system 400, and create individual new configuration files for sub-system A 410, sub-system B 420, and display module 450. These sub-systems may update their configurations with the new configuration files. After the updates, the configuration of the entire control system 400 may be synchronized in response to the single change to sub-system A 410.

Configuration synchronization system 140 in the present disclosure may provide increased efficiency and reliability in synchronizing the configuration of an entire controller network. For example, configuration synchronization system 140 may be capable of collecting configuration data from a plurality of controllers in the controller network, and monitoring configuration changes made to any of these controllers. Furthermore, in the event that a configuration change made to one controller may affect other controllers in the network, configuration synchronization system 140 may automatically optimize and synchronize configurations of the other controllers. As a result, consistency and compatibility of configurations among all the controllers in the network may be improved.

It will be apparent to those skilled in the art that various modifications and variations can be made to the disclosed configuration synchronization system 140 and configuration synchronization process without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for synchronizing configuration data on a machine, comprising:
   providing a controller network on the machine that includes a plurality of control modules, wherein the plurality of control modules have registration information stored thereon;
   detecting a registration information change associated with at least one control module in the controller network, the registration information change indicating that a new configuration file has been stored on the at least one control module since a previous synchronization of the plurality of control modules; and
   in response to detecting a registration information change indicating that a new configuration file has been stored on the at least one control module since a previous synchronization of the plurality of control modules:
      receiving current configuration data from the plurality of control modules;
      creating new configuration data for the plurality of control modules in the controller network based on the received current configuration data, wherein creating new configuration data includes:
         identifying, in the current configuration data for the at least one control module, an input/output parameter associated with the at least one control module; and
         generating a read/write request for at least another control module of the plurality of control modules to read/write the input/output parameter; and
      synchronizing the configuration of the plurality of control modules by updating the plurality of control modules with the created new configuration data.

2. The method of claim 1, wherein the registration information includes a most recent file update time stamp and a most recent synchronization time stamp.

3. The method of claim 2, wherein detecting a registration information change includes:
   receiving the registration information from the at least one control module in the controller network;
   comparing the most recent file update time stamp with the most recent synchronization time stamp; and
   detecting the registration information change if the most recent file update time stamp does not match the most recent synchronization time stamp.

4. The method of claim 1, wherein creating new configuration data for the plurality of control modules further includes:
   analyzing relationships of the current configuration data associated with the plurality of control modules in the controller network;
   optimizing the current configuration data based on available resources in the controller network and on the relationships of the current configuration data associated with the plurality of control modules.

5. The method of claim 4, wherein optimizing the current configuration data improves the communication efficiency of the controller network.

6. The method of claim 1, wherein synchronizing the configuration of the plurality of control modules includes:
   sending the created new configuration data to the plurality of control modules;
   updating the configuration of the plurality of control modules with the corresponding new configuration data; and
   receiving updated registration information from the plurality of control modules.

7. The method of claim 1, wherein synchronizing the configuration of the plurality of control modules includes:
   making a first attempt to synchronize the configuration of the plurality of control modules;
   receiving a confirmation from the plurality of control modules if the configuration of the plurality of control modules is synchronized; and
   making a second attempt to synchronize the configuration of the plurality of control modules, if the confirmation is not received.

8. The method of claim 1, further comprising:
   determining whether synchronization has failed; and
   when it is determined that synchronization has failed:
      clearing the new configuration data in the plurality of control modules; and
      reverting the configuration of the plurality of control modules to prior configuration data.

9. A configuration synchronization system for synchronizing configuration data in a controller network on a machine, wherein the controller network includes a plurality of control modules with registration information stored thereon, comprising:
   a processor on the machine and configured to:
      detect a registration information change associated with at least one control module in the controller network, the registration information change indicating that a new configuration file has been stored on the at least one control module since a previous synchronization of the plurality of control modules; and
      in response to detecting a registration information change indicating that a new configuration file has been stored on the at least one control module since a previous synchronization of the plurality of control modules:
         receive current configuration data from the plurality of control modules;
         create new configuration data for the plurality of control modules in the controller network based on the received current configuration data, wherein creating new configuration data includes:

identifying, in the current configuration data for the at least one control module, an input/output parameter associated with the at least one control module; and generating a read/write request for at least another control module of the plurality of control modules to read/write the input/output parameter; and synchronize the configuration of the plurality of control modules by updating the plurality of control modules with the created new configuration data; and a memory unit configured to store the current configuration data and the new configuration data.

10. The configuration synchronization system of claim 9, wherein the registration information includes a most recent file update time stamp and a most recent synchronization time stamp, and wherein the processor being configured to detect a registration information change includes the processor being configured to:

receive the registration information from a control module in the controller network;

compare the most recent file update time stamp with the most recent synchronization time stamp; and detect the registration information change if the most recent file update time stamp does not match the most recent synchronization time stamp.

11. The configuration synchronization system of claim 9, wherein the processor being configured to create new configuration data for the plurality of control modules further includes the processor being configured to:

analyze relationships of the current configuration data associated with the controller modules in the controller network;

optimize the current configuration data based on available resources in the controller network and on the relationships of the current configuration data associated with the plurality of control modules.

12. The configuration synchronization system of claim 9, wherein the processor being configured to synchronize the configuration of the plurality of control modules includes the processor being configured to:

send the created new configuration data to the plurality of control modules;

update the configuration of the plurality of control modules with the corresponding new configuration data; and receive updated registration information from the plurality of control modules.

13. The configuration synchronization system of claim 9, wherein the processor is further:

determine whether synchronization has failed; and when it is determined that synchronization has failed:
clear the new configuration data in the plurality of control modules; and
revert the configuration of the plurality of control modules to previously running configuration data.

14. The configuration synchronization system of claim 9, wherein the current configuration data and the new configuration data are stored under different file directories, and the current configuration data may be maintained in the memory unit until the synchronization succeeds.

15. A machine, comprising:

a controller network onboard the machine and including a plurality of control modules with registration information stored thereon; and a configuration synchronization system onboard the machine and coupled to the controller network, the configuration synchronization system being configured to:

detect a registration information change associated with at least one control module in the controller network, the registration information change indicating that a new configuration file has been stored on the at least one control module since a previous synchronization of the plurality of control modules; and in response to an indication that a new configuration file has been stored on the at least one control module since a prior synchronization of the plurality of control modules:

receive current configuration data from the plurality of control modules;

identify, in the current configuration data for the at least one control module, an input/output parameter associated with the at least one control module; and generate a read/write request for at least another control module of the plurality of control modules to read/write the input/output parameter;

create new configuration data for the plurality of control modules in the controller network, the new configuration data including the generated read/write request; and synchronize the configuration of the plurality of control modules by updating the plurality of control modules with the created new configuration data.

16. The machine of claim 15, wherein the registration information includes a most recent file update time stamp and a most recent synchronization time stamp, and wherein the configuration synchronization system being configured to detect a registration information change includes the configuration synchronization system being configured to:

receive the registration information from a control module in the controller network;

compare the most recent file update time stamp with the most recent synchronization time stamp; and detect the registration information change if the most recent file update time stamp does not match the most recent synchronization time stamp.

17. The machine of claim 15, wherein the configuration synchronization system is further configured to:

determine whether synchronization has failed; and when it is determined that synchronization has failed:
clear the new configuration data in the plurality of control modules; and
revert the configuration of the plurality of control modules to previously running configuration data.

18. The machine of claim 15, further including a display device configured to display status information related to synchronizing the configuration of the plurality of control modules.

* * * * *